3,027,226
RECOVERY OF BASE FROM WASTE LIQUOR
Shafi U. Hossain, Sault Ste. Marie, Ontario, Canada, assignor to Abitibi Power & Paper Company, Limited, Iroquois Falls, Ontario, Canada, a corporation of Canada
No Drawing. Filed Aug. 25, 1958, Ser. No. 757,122
Claims priority, application Canada Sept. 12, 1957
8 Claims. (Cl. 23—46)

This invention relates to a process for the recovery of the base from the spent (i.e. waste) liquor of a sodium or ammonium base process of preparing wood pulps.

The waste liquor may be that produced during a sulphite process in which wood chips are cooked with a solution containing as its effective constituents sodium or ammonium bisulphite together with an excess of free sulphurous acid. The waste liquor may alternatively be that produced during a bisulphite process in which wood chips are cooked with a substantially stoichiometric amount of sulphur dioxide to form sodium or ammonium bisulphite in the absence of excess sulphurous acid as described in British Patent 771,571. The waste liquor may also be obtained from a neutral sulphite semi-chemical cook. The waste liquor may, therefore, be the waste liquor of any neutral or acidic sulphite process for producing wood pulp.

Soluble bases such as sodium or ammonium have many advantages in comparison with the conventional less soluble calcium base. Thus sodium base cooks are inherently faster than the corresponding calcium base cooks under similar pH conditions, sodium being a lighter metal than calcium and, therefore, being able to effect faster penetration into the chips. A further advantage is that with a soluble base, it is possible to cook over a wide range of pH without encountering precipitation difficulties. This not only gives greater flexibility but also enhances the quality of the product as, in general, in sulphite pulping the higher the pH, the better are the strength characteristics of the pulp.

Sodium is, however, an expensive base compared with calcium and there has been considerable research directed to developing a suitable method of recovery of sodium from spent liquor. This research has been intensified by the necessity of avoiding stream pollution. Many complex and, therefore, costly chemical methods have been developed. It has also been proposed that ion exchange resins be used. Thus Bickell et al., British Patent 717,600, propose a process in which sodium base spent liquor is first evaporated and then burned to provide a smelt solution from which the base can be recovered by an ion exchange resin having weakly acidic ion exchange centres such as carboxylic acid groups. Regeneration to the hydrogen form is accomplished with sulphurous acid. Strongly acidic (e.g. sulphonic) cation exchangers have also been used. The chief obstacle to the development of a successful ion exchange process has been that strongly acidic cation exchangers, although highly efficient in their ability to pick up sodium from spent liquor show a poor performance at the subsequent stage where the adsorbed sodium is released by aqueous sulphur dioxide. On the other hand, weakly acidic (e.g. carboxylic) cation exchangers, such as the resin known under the trade name Amberlite IRC-50, are efficient at the release stage but cannot effectively be used to recover sodium values directly from the spent liquor. It is for this reason that in the above or similar processes it is necessary first to form a smelt. The lignosulphonic acid contained in spent liquor is a fairly strong acid and prevents weakly acidic cation exchangers from being effective.

It has been found in accordance with this invention that ion exchange resins of intermediate acidity that is, having a pK value from about 2 to about 4, and especially from 2.5 to 3.5, in the hydrogen form and particularly ion exchange resins having phosphonous acid or phosphonic acid exchange centres have the unexpected ability of recovering sodium or ammonium values directly from waste liquor and being capable of regeneration with sulphurous acid. There is a high overall efficiency of recovery and regeneration.

With both phosphonous and phosphonic acid ion exchange resins and also with other ion exchange resins such as those of the carboxylic acid type, the efficiency and capacity of the resin in adsorbing sodium or ammonium values from waste liquor is increased if, as a preliminary step the pH of the waste liquor is raised. The pH may be raised by the use of an anion exchange resin or in the case of the sodium base liquor and not the ammonium base liquor by pyrolysis with or without adding lime. It is preferred that the influent liquor have a pH not substantially less than 3.

The manner in which ion exchange resins having phosphonous acid or phosphonic acid ion exchange centres are prepared is well known. Two classes of ion exchange resins derived from phosphorous are, namely, a class in which phosphonous or phosponic groups are attached to the aromatic nucleus of the basic copolymer resin and a second class in which phosphonous groups are attached through a methylene group, that is, on a side chain. In some cases sulphonic groups are associated with phosphonic groups. The detailed preparation of the nuclear phosphonic type is described in British Patent 726,918. British Patent 726,918 and U.S. 2,764,563 also describe the preparation of resins of the nuclear phosphonic type to which sulphonic groups have been added. The preparation of resins of the methylene phosphonic type is shown in U.S. 2,764,562 and British Patent 726,925. U.S. 2,764,561 describes the methylene phosphonic type with added sulphonic groups. Ion exchange resins having phosphonous acid ion exchange centres are also available under the trade name Duolite C-62. The phosphonic acid type is available under the trade name Duolite C-63. Both of these Duolite resins are made by the Chemical Process Company, Redwood City, California. The Duolite C-62 resin is prepared by reacting divinylbenzene cross linked polystyrene with phosphorous trichloride in the presence of aluminum chloride following the procedure described in Abram's U.S. Patent 2,844,546. The pK value of a phosphonous type resin such as Duolite C-62 is about 3 and of Duolite C-63 is 3.3. Phosphonous acid type cation exchangers are also supplied by the Permutit company. The preparation of this cation exchanger is described in Example XIV hereof.

*Example I*

A series of experiments was conducted with ion exchange columns made up from a phosphonous acid type resin known by the trade name Duolite C-62. The resin columns were made up in 100 ml. volumetric burettes and had a height of 26.7 cm. and a cross sectional area of 1.92 sq. cm. The weight (on an oven-dry basis) of the resin in each column was 25 g.

The columns were exhausted and regenerated with 4% NaOH and 3.7% HCl prior to use. The cycle of exhaustion and regeneration was repeated to ensure proper activation of the resin beds. After the exhaustion-regeneration cycle, the resin columns were washed with copious quantities of distilled water until all soluble matter was washed out. The rate of flow, for both the exhaustion and the regeneration steps was kept at one drop per second.

A 5 ml. sample of original (i.e. unmodified) spent liquor from a cook prepared in accordance with the procedure described in British Patent 771,571, and obtained from a black spruce cook (49% yield), having a total liquor solid content of 12.5% and a percentage of sodium in the liquor of 0.96% (w./v.) and a pH of 3.65, was passed through one of the columns, at the rate of one drop per second. After the exchange, the column was thoroughly washed with water, and the washings added to the effluent. The pH of the liquor, on passing through the exchange dropped from 3.65 to 1.7. The total sodium in the effluent (and washings) was determined. From a knowledge of the amount of sodium in the influent liquor, the percent pick-up was computed to be 99%.

Sodium, in this and subsequent examples, was determined by the flame photometer method at 5890 A. using a model DU Beckman spectrophotometer.

The column was then released with aqueous sulphur dioxide (5% solution by weight). A 100 ml. volume of this solution was used for the sodium release step. All of the sodium adsorbed on the column in the pick-up step appeared in the effluent from the release step, proving that the efficiency of the release step was theoretical. The possibility of the oxidation of sulphurous acid was also investigated. No sulphuric acid could be detected in the regenerant solution, either before or after passing through the column. As a further precautionary measure, in one experiment, one ml. of glycerol was added to the regenerant solution before it was passed through the exchange column to suppress any oxidation of sulphurous acid to sulphuric acid.

In a number of replicate experiments, using 5 ml. of original spent liquor, pick-up efficiencies ranging between 97–99% were obtained. The release efficiencies also varied between 97–99%. Thus, the overall efficiency figure (i.e. the percentage of sodium present in the original spent liquor recovered as the bisulphite) was in the range 94–98%. The regenerant solutions used had from 3 to 7% sulphur dioxide in water and a pH of about 1.0.

*Example II*

A series of experiments similar to Example I was conducted using 10 ml. of spent liquor, keeping all other factors (i.e. amount of resin, height of resin bed, rate of flow, etc.) constant. The pick-up efficiencies ranged between 90–92%, and the release efficiencies were between 94.3–94.6%. The overall efficiency obtained was, therefore, approximately 86%.

The overall efficiency obtained in accordance with Examples I and II is superior to those obtained using weakly acidic or strongly acidic resins. In comparative experiments, utilizing weakly acidic (Amberlite IRC–50) columns containing 29 g. (on a bone-dry basis) of resin, and with a column-height almost twice the height of the Duolite C–62 columns, when 10 ml. of original spent liquor was ion-exchanged on the Amberlite IRC–50 column, the pick-up efficiency was only 26%.

Comparative experiments were made to investigate the relative release efficiencies (with aqueous sulphur dioxide) of the phosphonous acid type resin, Duolite C–62, and the strongly acidic sulphonic acid type cation exchanger, Dowex 50–X8 (sold by Dow Chemical Co., Midland, Michigan). For this purpose, a Dowex 50–X8 column was set up in a 100 ml. volumetric burette with 30 g. of resin (on a bone-dry basis). The height of the column was 31 cm. and the cross sectional area, 1.92 sq. cm.

A 10 ml. sample of original spent liquor was passed through the Dowex 50–X8 column, at the rate of one drop per second. As usual, the column was washed with water and the washings were added to the effluent. A sodium analysis of the effluent (and washings) revealed a pick-up efficiency of 100%. The release step was carried out by a 5.6% solution of sulphur dioxide in water. An overwhelming excess of this regenerant solution (500 ml. which contained 28 g. of sulphur dioxide) was used to augment the release of sodium from the Dowex 50–X8 column. The effluent contained no sodium, showing that no release had taken place. In one experiment, the sulphur dioxide solution was chilled to 0–3° C. for the release step, in order to increase the acidity of the sulphur dioxide solution (aqueous sulphur dioxide has a much higher apparent dissociation constant at 0° C. than at 20° C.). Still no sodium could be detected in the effluent. This demonstrated the difficulty of releasing sodium from a Dowex 50–X8 column with aqueous sulphur dioxide.

*Example III*

A liquor from the same cook as in Examples I and II was pyrolyzed at 250° C. for thirty minutes (see Example VII). The resin columns used were of the phosphonous acid type (Duolite C–62). The height of the columns was 26.7 cm. and the cross sectional area, 1.92 sq. cm. The amount of resin used per column was 25 g., calculated on a bone-dry basis.

A 250 ml. volume of the pyrolyzed spent liquor (with a sodium content equivalent to 39 ml. of the original spent liquor) from the autoclave treatment, without any concentration, was passed through one of the Duolite C–62 columns at the rate of one drop per second. After the exchange, the column was washed with water, and the washings were added to the effluent. The sodium content of the effluent (and washings) was then determined. In replicate experiments, pick-up efficiencies between 93–95% were obtained.

*Example IV*

In a further experiment the pyrolyzed liquor, mentioned in the previous paragraph, was concentrated to a sodium concentration of 1382 mg. of Na per 100 ml. (the sodium concentration of the original spent liquor was 960 mg. of Na per 100 ml.). A 50 ml. sample of this concentrated pyrolyzed liquor was passed through one of the Duolite C–62 columns referred to in the previous paragraph. The technique described with reference to Example I was followed and a pick-up efficiency of 83% was achieved. Projecting this finding, one may conclude that, if the pyrolyzed liquor is concentrated to the same sodium concentration as the original spent liquor (i.e., to 960 mg. Na per 100 ml. instead of 1382 mg. Na per 100 ml.), the pick-up efficiency would be over 90%.

*Example V*

In another set of experiments, the release of sodium from the Duolite C–62 columns was effected with just the theoretical (i.e., stoichiometric) amount of 3.4% aqueous sulfur dioxide needed to form $NaHSO_3$ with the adsorbed sodium in the columns. The release efficiencies in replicate experiments were between 78–81%. This was considered very satisfactory as a small amount of sulphur dioxide was unavoidably lost to the atmosphere during the release step (the ion-exchange columns were open to the atmosphere).

*Example VI*

Experiments were conducted to establish the improvement achieved by a preliminary pyrolysis treatment with lime when a carboxylic type resin was being used. A one-litre laboratory autoclave, equipped with a mechanical stirrer and an automatic temperature controller, was used for the high temperature lime treatment. A 500 ml. volume of the spent liquor, directly from the digester, was placed in the autoclave, the requisite amount of lime (as CaO) added, the temperature controller set at the desired point, and then the heating circuits were turned on. After a predetermined reaction time, the autoclave was allowed to cool down to room temperature. The contents of the autoclave were then filtered and the solid residue thoroughly washed with water. The filtrate (including the washings) was collected and made up to 3000 ml. Aliquots were then withdrawn for the purpose of sodium and sulphur analyses. A portion of the filtrate was then made ready for ion-exchange by concentrating approximately to the same sodium concentration as the original unmodified spent liquor. This step was necessary for strict comparison with the original spent liquor and was designed to eliminate the dilution effect caused by the washing of the solid residue after lime treatment. In industrial operations, where washing would be kept to a minimum, this step would not be required.

A series of lime-treatment experiments was performed to locate the optimum combination of the three important variables, ratio of lime to spent liquor by weight, the temperaure of reaction, and the time at the reaction temperature. The operating conditions may be varied within fairly wide limits as shown by the following range:

Quantity of lime_____ 10–60 g. CaO per 500 ml. spent liquor.
Temp. of treatment_____ 200°–300° C.
Time of temp_____ ½ hr.–4 hr.

The preferred conditions were 10 g. CaO per 500 ml. spent liquor and one hour at 250° C. The sodium recovery figures in the following paragraphs refer to this set of conditions.

For the ion-exchange step, two columns were set up. Volumetric burettes (100 ml. capacity) were used as the resin columns, allowing the resin to rest on cotton plugs. The ion-exchange resin used was a carboxylic type cation exchanger, sold under the trade name Amberlite IRC–50 by the Rohm and Haas Co., Philadelphia, Pa. The height of the columns was 52 cm. and the cross sectional area 1.92 sq. cm. Each column contained 29 g. of resin, calculated, on a bone-dry basis. Prior to the actual exchange operations, the columns were exhausted with 4% NaOH, regenerated with 3.7% HCl until the effluent was sodium-free, and washed with distilled water until the effluent was chloride-free.

Through one of the columns, a 10 ml. sample of the lime treated spent liquor was passed, and through the other, a 10 ml. sample of the original (i.e. unmodified) spent liquor was passed. The rate of flow was kept at one drop per second. After the exchange the columns were washed with water and the washings were added to the respective effluents. The pH of the liquor, on passing through the column, fell from 7.4 to 2.9, and that of the original spent liquor, from 3.6 to 2.9. The sodium contents of the effluents were determined and the figures showed that the Amberlite column had picked up 73% of the sodium from the lime-treated liquor and only 26% of the sodium from the original spent liquor. Thus it was clearly demonstrated that the lime-treatment step considerably improved the pick-up efficiency of Amberlite IRC–50 in respect of sodium recovery from the spent liquor.

For the sodium release stage, an 8% (by wt.) sulphur dioxide solution in water was used. A 100 ml. volume of this regenerant solution was passed through each of the columns, and the quantities of sodium in the effluents were determined. All the sodium adsorbed on the columns appeared in the effluents, proving theoretical efficiency in the release stage. In replicate experiments, the release efficiency was found to vary between 96.5–100%. Thus the overall efficiency of the process (i.e., pick-up efficiency×release efficiency) was very close to the pick-up efficiency. When a 10 ml. sample of the lime-treated liquor was ion-exchanged without any concentration step, the pick-up efficiency rose to 89%.

*Example VII*

Further experiments were conducted to determine the improvement achieved by high temperature pyrolysis of spent liquor.

This set of experiments was performed in the laboratory autoclave in the same fashion as the experiments in Example VI, the only difference being that no lime (or any other additive) was added to the spent liquor prior to the treatment in the autoclave. Once again, a series of experiments was conducted to locate the optimum conditions of reaction temperature and reaction time. Whereas any temperature between 200° C.–300° C. with a reaction time of ¼ hr. to 3 hrs. may be used, it was found that a reaction temperature of 300° C. and a reaction time of 30 min. were the most suitable. The experimental results in the following paragraph refer to this set of conditions.

The pyrolyzed spent liquor from the autoclave was filtered from the carbonized solid residue, and the residue was thoroughly washed. The filtrate and the washings were collected and made up to a volume of 3000 ml. As in Example VI, a portion was withdrawn and concentrated to have approximately the same sodium concentration as the original spent liquor. A 10 ml. sample of this liquor was ion-exchanged in the Amberlite IRC–50 column, with a flow rate of one drop per second, in a manner exactly analogous to the experiments described in Example VI. After the ion-exchange, the column was thoroughly washed with water, and the washings added to the effluent. The sodium content of the effluent was then determined. The results showed that the ion-exchange column had picked up 73% of the sodium present in the influent liquor. The sodium was released from the column by 100 ml. of 8% aqueous sulphur dioxide, exactly as in Example VI, and a complete release of sodium was accomplished. Remembering that the Amberlite IRC–50 column had a sodium pick-up efficiency of only 26%, as demonstrated in Example VI when original (unmodified) spent liquor was used, it was evident that the pyrolysis step considerably enhanced the sodium pick-up efficiency of Amberlite IRC–50 with respect to the spent liquor. As can be seen from the figures, the improvement was of the same degree as achieved by lime treatment of the spent liquor (10 g. CaO per 500 ml. spent liquor) at 250° C. for one hour.

When the concentration step following pyrolysis was omitted, the pick-up efficiency of the ion-exchange column in regard to the pyrolyzed spent liquor rose to 90%, making the analogy between the pyrolyzed spent liquor (300° C.; ½ hr.) and the lime-treated liquor (10 g. CaO+500 ml. spent liquor at 250° C. for 1 hr.) almost complete.

*Example VIII*

For a further experiment, the spent liquor which was pyrolyzed for thirty minutes between the temperature range 250°–270° C. with 2% (w./v.) CaO was chosen. After filtering out the precipitated solids, the pyrolyzed liquor was ion-exchanged through a phosphonous acid type (Duolite C–62) cation exchange column having the same dimensions as in Example I.

A volume of 10 ml. was passed through the column in the usual way, and the column washed with water till the washings were free of sodium. Both the influent liquor and the effluent (and washings) were analyzed for sodium, and the amount of sodium picked up by the Duolite C–62 column was calculated. The pick-up efficiency obtained was 98.4%.

*Example IX*

For this series of experiments, a spent liquor obtained from a commercial neutral sulphite semi chemical cook was chosen. The liquor had a pH of 9 and a sodium content of 2080 mg. of sodium per 100 ml.

A volume of 20 ml. of the liquor was passed through a Duolite C–62 (phosphonous acid type) column of the same dimensions as in Example I. The rate of flow was kept at one drop per second. After the exchange, the column was washed with water till the washings were free of sodium. From an analysis of the influent and effluent liquors, the sodium pick-up efficiency was found to be 89%.

The sodium content of the N.S.S.C. liquor was more than twice that of the spent liquor (obtained from a sodium bisulphite cook) used in Example I. Moreover, for the experiment with N.S.S.C. liquor the volume of liquor ion exchanged was twice the volume used in the instances when the sodium bisulphite spent liquor was used. Thus it was seen that with N.S.S.C. liquor the capacity for sodium, at the same pick-up level, was four times the capacity when sodium bisulphite spent liquors were used.

In order to release the adsorbed sodium from the column, a 5.4% (w./v.) aqueous solution of sulphur dioxide was used, the amount of sulphur dioxide used was 5% in excess of the stoichiometric amount required for the formation of sodium bisulphite. The release efficiency obtained was 88%.

*Example X*

This experiment was conducted with a spent liquor obtained from an acid sodium bisulphite cook similar to a commercial sulphite cook. The pH of the liquor as obtained was 3.15; a few minutes of boiling drove off the excess sulphur dioxide and the pH rose to 4.7. This liquor was used for the ion-exchange experiment.

A five ml. volume of the liquor was ion-exchanged through a Duolite C–62 (phosphonous acid type) column, keeping the column dimensions, rate of flow etc. same as in the experiments in Example I.

The pick-up efficiency was calculated in the usual way and found to be 89.5%.

*Example XI*

For this experiment the N.S.S.C. liquor referred to in Example IX was used. The resin used was a phosphonic acid type cation exchanger sold by the Chemical Process Company of California under the trade name Duolite C–63. The weight of the resin column was the same as the Duolite C–62 column used (phosphonous acid type) in Example I.

A 20 ml. volume of the N.S.S.C. liquor was passed through the column at the rate of one drop per second and the column washed with water till the washings were free of sodium. The pick-up efficiency was calculated in the usual way and was found to be 86%.

A further experiment was carried out with the phosphonic acid type resin (Duolite C–63), using the spent liquor obtained from a sodium bisulphite cook. The liquor contained 1046 mg. of sodium per 100 ml. A 10 ml. volume of this liquor was used for ion-exchange, keeping all other variables (e.g. resin weight, rate of flow etc.) identical with Duolite C–62 (phosphonous acid) series of experiments. The pick-up efficiency was 78%.

The column was released with 20 ml. of 5.4% aqueous sulphur dioxide; the release efficiency was 92%.

*Example XII*

Results substantially similar to Examples X and XI will be obtained with an ion-exchange resin made in accordance with Example I of British Patent 726,918.

*Example XIII*

A series of experiments was conducted with ammonia base liquor.

A rapid distillation method was utilized for the determination of ammonia in the spent liquor. In its essentials, the method consisted in a rapid distillation (distillation time not exceeding fifteen minutes) of the spent liquor in the presence of excess caustic alkali, receiving the distillate in excess standard acid, and back titrating the excess acid with standard alkali. The method was checked against the steam distillation procedure proposed by Samuelson et al., and also against a method involving the use of a strongly acidic (sulphonic) type cation exchanger, Dowex 50–X8. The latter method involved the passage of a small volume of the ammonia base liquor through a column of Dowex 50–X8. Pick-up of the $NH_4^+$ ions was complete as no $NH_4^+$ could be detected in the effluent (negative Nessler). The adsorbed $NH_4^+$ was then released from the Dowex 50–X8 column by an excess of 6 N $H_2SO_4$. The release was continued till the effluent gave a negative Nessler test. The ammonia in the effluent from Dowex 50–X8 was determined by distillation with excess alkali in the customary fashion. All the three methods gave easily reproducible and mutually concordant results.

The ammonia base spent liquor had a pH of 3.0 and an ammonia content (calculated as $NH_3$) of 0.50%.

The Duolite C–62 column (phosphonous acid type) was set up in the usual way in a 100 ml. volumetric burette exactly as in Example I.

A 10 ml. sample of the spent liquor, without any prior treatment was passed through the column at the rate of one drop per second. The pH of the liquor fell from 3.0 to 1.18 during the exchange process. The column was washed with water till the washings were $NH_4^+$ free (Nessler). The effluent (and washings) were collected and submitted to a Kjeldahl type distillation with excess of 40% NaOH solution. The distillate was received in a solution of standard sulphuric acid. The unconsumed acid was determined by titration with standard $Na_2CO_3$ to a methyl red end point. The amount of ammonia in the effluent was computed from the titration data. The ammonia pick-up efficiency obtained was 97%.

The Duolite C–62 column was released with 25 ml. of 4.8% aqueous solution of sulphur dioxide in the usual way. The column was washed with water till the washings were ammonia free (Nessler) and the ammonia content of the effluent was determined by a Kjeldahl type distillation in presence of excess 40% NaOH solution. The release efficiency was computed to be 94%.

*Example XIV*

A phosphonous acid resin was prepared by treating 450 g. of a dry granular styrene divinylbenzene copolymer (containing 5% divinylbenzene) and having a particle size in the range of —20 to +50 mesh with 1000 ml. tetrachlorethane in a 3 l. flask. 2270 g. of phosphorous trichloride were added and then 700 g. of anhydrous aluminum chloride were added with stirring. The contents of the flask were stirred and maintained under reflux for 18 hrs. The treated resin was then separated from the excess aluminum chloride, phosphorous trichloride and tetrachlorethane. The resin was then added to crushed ice. The red-brown resin turned yellow with evolution of HCl. The excess aluminum chloride was washed from the resin. The resin was then treated with 2 l. of 5% NaOH for 4 hrs. The excess NaOH was washed from the resin and the resin was converted to the hydrogen form by treatment with an excess of 6 N hydrochloric acid during a 30 min. period. The resin has a pK value of 3.5.

A phosphonous acid resin made as described in the preceding paragraph was formed into a resin bed in a 100 ml. burette and used to recover sodium from a liquor similar to that used in Example I except that the pH was 3.5. The resin showed a sodium pick-up capacity of 0.137 meq. of Na per dry gram of resin. The sodium release efficiency was 98% using four equivalents of sulphur dioxide (6% aqueous solution).

*Example XV*

Examples II, III, IV, V, VIII, IX, X and XIII may be repeated with a resin prepared as described in Example XIV to give the same results as those obtained in accordance with the respective examples.

I claim:
1. A process for recovering with a high overall efficiency of at least about 72% values selected from the group consisting of sodium and ammonium values from the waste liquor of a neutral sulphite, bisulphite or acid sulphite process having a base selected from the group consisting of sodium and ammonium for producing wood pulp characterized by the steps of adsorbing a base selected from the group consisting of sodium and ammonium from the waste liquor with an ion exchange material of intermediate acidity having a pK value of between 2.5 and 3.5 in the hydrogen form, and regenerating the ion exchange material with a sulphurous acid solution.

2. A process as in claim 1 in which the ion exchange material has ion exchange centres selected from the group consisting of phosphonous acid and phosphonic acid.

3. A process for recovering sodium values as in claim 1 in which the waste liquor is preliminarily subjected to a relatively mild pyrolysis to produce a still-aqueous pretreated waste liquor before sodium is absorbed by the ion exchange material.

4. A process for recovering sodium values as in claim 1 in which the waste liquor is preliminarily subjected to a relatively mild pyrolysis in the presence of lime to produce a still-aqueous pretreated waste liquor in the presence of lime before sodium is adsorbed by the ion exchange material.

5. A process for recovering with a high overall efficiency of at least about 72% sodium values from the waste liquor of a sodium base neutral sulphite, bisulphite, or acid sulphite process for producing wood pulp characterized by the steps of preliminarily subjecting said waste liquor to a relatively mild pyrolysis to produce a still-aqueous pretreated waste liquor, adsorbing sodium from the pretreated waste liquor with an ion exchange material selected from the group consisting of ion exchange materials of weak acidity and of intermediate acidity having a pK value of between 2.5 and 3.5 in the hydrogen form, and regenerating the ion exchange material with a sulphurous acid solution.

6. A process as in claim 5 in which the preliminary relatively mild pyrolysis step is carried out in the presence of lime.

7. A process as in claim 5 in which the ion exchange material has an exchange centre selected from the group consisting of carboxylic acid, phosphonous acid and phosphonic acid.

8. A method as in claim 5 in which the said relatively mild pyrolysis is conducted at about 200 to 300 degrees C. for about half an hour to four hours.

References Cited in the file of this patent

UNITED STATES PATENTS

| | | |
|---|---|---|
| 2,656,244 | Gray et al. | Oct. 20, 1953 |
| 2,764,561 | McMaster et al. | Sept. 25, 1956 |
| 2,764,562 | Drake | Sept. 25, 1956 |
| 2,778,714 | Kasper et al. | Jan. 22, 1957 |
| 2,785,955 | Potter et al. | Mar. 19, 1957 |
| 2,837,488 | Ferris | June 3, 1958 |
| 2,844,546 | Abrams | July 22, 1958 |
| 2,916,355 | Swenson | Dec. 8, 1959 |

FOREIGN PATENTS

| | | |
|---|---|---|
| 717,600 | Great Britain | Oct. 27, 1954 |
| 726,925 | Great Britain | Mar. 23, 1955 |
| 478,026 | Canada | Oct. 23, 1951 |